United States Patent [19]

Gray

[11] Patent Number: 4,692,293

[45] Date of Patent: Sep. 8, 1987

[54] MOLD METHOD FOR MULTI-COLOR PLASTIC SHELLS

[75] Inventor: John D. Gray, New Durham, N.H.

[73] Assignee: Ex-Cell-O Corporation, Walled Lake, Mich.

[21] Appl. No.: 869,789

[22] Filed: Jun. 2, 1986

Related U.S. Application Data

[62] Division of Ser. No. 794,805, Nov. 4, 1985, Pat. No. 4,634,360.

[51] Int. Cl.⁴ .................... B29C 39/12; B29C 65/02
[52] U.S. Cl. ................................ 264/245; 264/248; 264/310; 264/DIG. 60
[58] Field of Search ............. 264/245, 248, DIG. 60, 264/310

[56] References Cited

U.S. PATENT DOCUMENTS

| | | | |
|---|---|---|---|
| 3,492,307 | 1/1970 | Haskinson | 425/145 |
| 3,506,755 | 4/1970 | Rudder et al. | 264/297.7 |
| 3,914,361 | 10/1975 | Shiina et al. | 264/310 |
| 4,562,025 | 12/1985 | Gray | 264/DIG. 60 |

Primary Examiner—Jan H. Silbaugh
Assistant Examiner—Neil M. McCarthy
Attorney, Agent, or Firm—John C. Evans

[57] ABSTRACT

Apparatus and a process for manufacturing multiple color thin-walled hollow sheels for parts such as automobile door panels, consoles and instrument panels from dry thermoplastic plastisol includes a supply box with a divider to form two or more compartments in the box. The box divider cooperates with selectively positioned split mold parts defining a separation in an open-ended heated mold for separating the mold into two or more sections. Complementary open ends of the charge box and mold are joined. Then the apparatus is rotated so that the powder is distributed into each mold section by gravity flow with the powder from each section flowing to the divider which separates the colors so as to form two or more tones on a resultant shell of cured material; thereafter the powder box is removed and the split mold parts are joined to clamp cast shell segments for fusion at a joint line.

3 Claims, 9 Drawing Figures

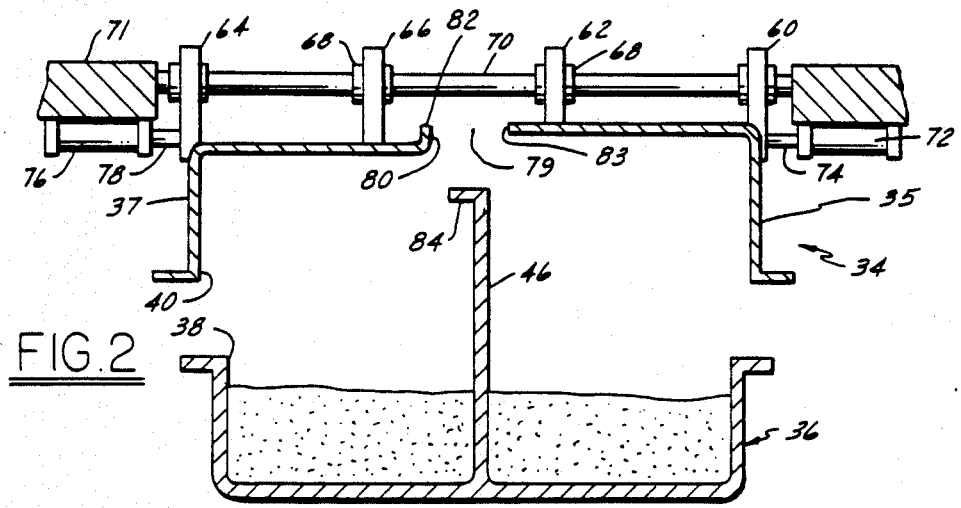

MOLD METHOD FOR MULTI-COLOR PLASTIC SHELLS

This application is a division of application Ser. No. 794,805, filed Nov. 4, 1985, and now U.S. Pat. No. 4,634,360, issued Jan. 6, 1987.

TECHNICAL FIELD

This invention pertains to an improved plastic shell and a method and apparatus for making such articles especially suitable for use in automobile trim components such as interior door panels and more particularly to two-tone plastic shells and method and apparatus for processing dry thermoplastic plastisol to form such articles to have two or more tone colors and an integral joint line.

BACKGROUND ART

The automotive industry has turned to the use of interior trim components such as door panels comprising a polyvinyl chloride shell. See, for example, the trim components disclosed in U.S. Pat. No. 3,123,403. The acceptance of such components has been because inter alia this type of construction permits a wide latitude in styling and color, and grain effects which are most desired particularly in the interior design of automobiles.

The current state of the art includes a pre-formed grained vinyl shell made from dry thermoplastic plastisol particles which are applied to a heated shell mold from a supply box to form a continuous monochromatic one-piece shell.

In order to enhance the interior decor of an automobile, interior door panels and other parts have been proposed which include two separate plastic shell sections formed from different colored plastic joined by a separate connector strip at a connection joint.

The use of multi-color plastic is also known in the manufacture of colored filaments. Such manufacture includes use of a compartmented spinning head for making two-colored yarn as disclosed in U.S. Pat. No. 3,049,397 issued Aug. 14, 1962 for Process of Making Space-Dyed Yarn.

Apparatus and method for multiple colored thermoplastic floor materials are set forth in U.S. Pat. No. 3,383,442 issued May 14, 1968.

Also, the use of movable dividers in molds for molding products is known as practiced in U.S. Pat. No. 1,521,316, issued Dec. 30, 1924; U.S. Pat. No. 3,859,016, issued Jan. 7, 1975 and U.S. Pat. No. 4,335,068, issued June 15, 1982.

None of the aforesaid methods and apparatus for manufacture of plastic products is directed to a process or apparatus for manufacturing a single piece shell product, for example, an interior panel component of an automobile.

STATEMENT OF INVENTION AND ADVANTAGES

In accordance with the present invention a process and apparatus for loading an open-ended heated mold with powder plastisol material includes the process of releasing a pre-charge of two or more colors of thermoplastic plastisol from separate compartments in charge box means for gravity flow into a mold of split tooling configured for movable association with a divider to produce a one-piece shell with two or more color tones to enhance the decor of the interior of an automobile.

The process includes providing an open-ended charge box with a divider means to form two or more separate compartments; each of which is filled with a predetermined quantity of different color plastisol. Complementary open ends on the charge box means and on an open-ended mold are joined to form a closed system. The mold has split portions which are sealed with respect to the divider means to separate each compartment of the charge box means. The closed system is rotated so that the charge box releases the plastisol from the separate charge box compartments to flow evenly through the open end of the mold by gravity and against casting surfaces on each of the split mold portions so as to produce a uniform thin shell on each split mold portion.

The charge box and divider means are removed from the mold; thereafter the split mold portions are joined to form a joint between the separately cast shells.

Molding apparatus of the invention includes a gravity fill system for flow of dry plastisol material onto a heated casting surface of a mold to form a thin walled single plastic part of multi-color and for return of excess plastisol material from the mold including charge box means having a plurality of separate compartments; each of the separate compartments adapted to be filled with a different color dry plastisol and each of the compartments extending across an open end of the charge box means. Means are provided for coupling the box to the mold at complementary openings therein; split mold portions and a divider partition the mold to receive a single color plastic powder on each of spaced casting surface regions on split portions of the mold; and means are provided to operate the coupled box and mold to dispose the charge box with respect to the mold for gravity flow of dry plastisol from each of the separate charge box compartments onto the split portions of the mold so that plastisol particles cover uniformly heated separate surfaces on each split portion of the mold with a different colored material; and means are further provided to clamp and unclamp the split mold portions from the divider following formation of cast shells on each split mold portion and to clamp each of the cast shells together to form an integral joint therebetween.

Other advantages and a more complete understanding of the invention will be apparent to those skilled in the art from the succeeding detailed description of the invention and the accompanying drawings thereof.

BRIEF DESCRIPTION OF DRAWINGS

FIG. 2 is a diagrammatically shown sectional view of a mold component of the inventive apparatus in association with a charge box;

FIG. 3 is a diagrammatically shown sectional view of a box of the invention sealed to the mold of FIG. 2 in a pre-release position;

FIG. 4 is a sectional view like FIG. 3 showing the box and mold in a plastisol release orientation;

DETAILED DESCRIPTION OF THE INVENTION

The process and apparatus of the present invention will be described with reference to the production of plastic thin-walled shells for a typical automotive part such as an interior door panel, console panel or instrument panel.

Figure 1:
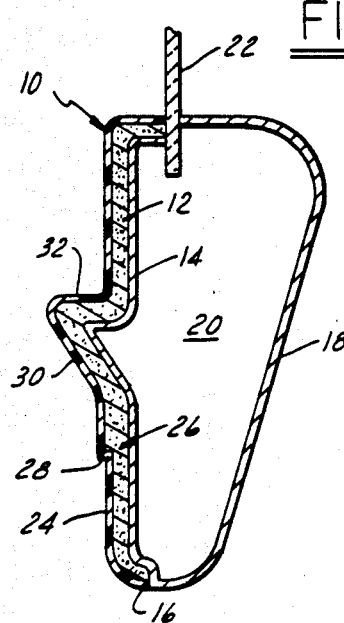
FIG. 1 is a schematic view of a single-piece multi-color panel of the present invention shown with associated component parts of an automotive vehicle door panel.

FIG. 1 shows a typical automobile door panel application of a multi-color, single-piece interior plastic shell 10. The shell 10, preferably made of polyvinyl chloride material, is backed by a layer of polyurethane foam 12 bonded to the shell 10 by a mold process such as in U.S. Pat. No. 3,123,403, issued Mar. 3, 1964 for Automobile Arm Rest. An interior reinforcing insert 14 is connected at a joint 16 to an outer door shell 18 to form an interior space 20 for window lift mechanism (not illustrated) to raise and lower a window 22.

In accordance with the present invention the shell is a one-piece plastic part with an integral lower panel 24 of a drycast plastic having a first color. The shell 10 includes an integral joint 26 which is at the base of a recessed groove 28. The groove 28 forms a transition to an integrally formed upper panel 30 including an armrest segment 32 formed of drycast plastic having a second color contrasting or complementing the color of the first panel 24 or other interior components. For example, the upper panel can be red, blue, yellow or beige to contrast with or complement the interior color of seats, headliners, instrument panels and the like. The lower panel 24 can be colored a deeper complementary tone color of a character which has a low impact or scuff display character.

Referring to FIGS. 2-4, a dry plastisol molding process line is schematically shown as including selectively heated mold 34 with split portions 35,37. A plastisol box 36 is operated between raised and lowered positions with respect to the mold 34 by suitable handling equipment, one type of which is specifically set forth in co-pending U.S. Pat. No. 500,760 filed June 3, 1983 for Mold Loading Method and Apparatus.

The box 36 further includes an upper open end 38 which is configured to cover the planar extent of a complementary opening 40 to mold 34.

Clamp means 42 join and seal the charge box 36 to mold 34 when the box 36 is elevated to the position shown in FIG. 3, hereinafter referred to as the "mold-up" position.

As a result, the interior of box 36 and the interior of mold 34 form a closed system 44 having plastisol charges in the box 36.

In accordance with the process and apparatus of the present invention, the box 36 is provided with a divider 46 and the mold 34 has its split portions 35,37 movable between clamping and unclamped positions to be described.

The divider 46 and split portions 35,37 are in contact during plastisol casting to form two separate compartments 50,52 each containing a charge of plastic plastisol material of a different color (color A in 50, color B in 52).

The casting process step includes concurrent rotation of the closed system 44 by drive means 53 about axis 54 defined by trunnions means of the type set forth in co-pending U.S. Pat. No. 500,760 through 180° relative to the FIG. 3 position.

At FIG. 4 a fill step of the process is shown in which dry plastisol is distributed evenly throughout the mold opening 40. A resultant even build-up of cast plastisol occurs on pre-heated casting surfaces 56,58 on the split portions 35,37, respectively, of the mold 34. The mold position shown in FIG. 4 will hereinafter be referred to as the "mold-down" position.

Following the fill step, the joined mold 34 and charge box 36 are again rotated 180° by the drive means so that the mold 34 is located vertically above the box 36 in the moldup position.

An air-jet system of the type shown in the co-pending U.S. Pat. No. 500,760 may be used to dislodge excess plastisol from the walls of the mold by the drive means so that the dislodged material will flow by gravity return to the interior of the box for collection and reuse in the system.

Figure 6:
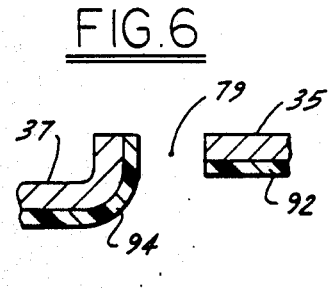
FIG. 6 is a fragmentary, enlarged sectional view of the split mold parts disposed for removal of a charge box and divider.

A plastisol fuse cycle is then carried out in accordance with known practice wherein the plastisol particles are partially fused as a thin-walled part. The charge box is unclamped from the mold 34 and the split portions 35,37 are separated by a space 60 so that the divider 46 as shown in FIG. 6 and the box 36 can be removed from the mold and returned to a plastisol make-up position. Thereafter the mold split portions 35,37 are clamped with the plastisol cast to the surfaces 56,58 being forced together when partially fused. The unit is heated further to finally fuse the plastisol, then is cooled and rotated 180° into a strip position corresponding to the mold-down position. Make-up plastisol of appropriate color is fed to the multiple separate color compartments.

In accordance with the present invention, the split portions 35,37 and divider 46 are specially configured and sequentially, operatively positioned to produce an integral joint between plastisol cast on the respective surfaces 56,58. More specifically, as shown in FIG. 2, the split portions 35,37 have spaced supports 60,62 and 64,66, respectively, fixed thereto. Each of the supports 60–66 carry a bearing 68 that is slidably supported on a guide rod 70 which is supported to a mold support 71. A reciprocating drive unit 72 has its drive shaft 74 coupled to split portion 35 to reciprocate it through clamping and unclamping movements on rod 70 with respect to split portion 37. Likewise, a reciprocating drive unit 76 has its drive shaft 78 connected to split portion 37 to reciprocate it through clamping and unclamping movements on rod 70 with respect to split portion 35.

In FIG. 2, the portions 35,37 are moved into a first unclamped position which defines the opening 79 between a surface 80 on bent edge 82 of portion 37 and a straight edge 83 on portion 35. The opening 79 is sized to receive a bent end 84 of the divider 46 as the mold 34 and box 36 are initially joined.

Figure 5:
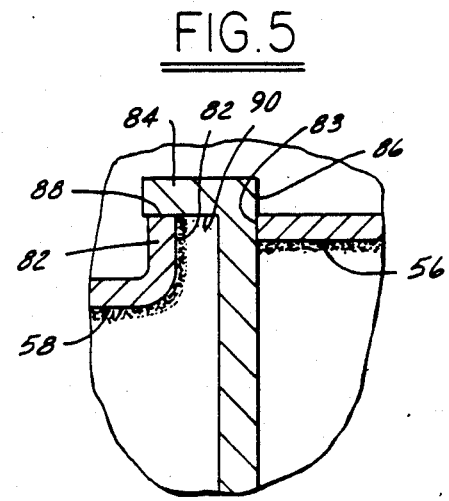
FIG. 5 is a fragmentary, enlarged sectional view of a split mold and divider means disposed in a plastisol particle casting disposition.

Once the bent end 84 is positioned in the opening 79, the portions 35,37 are moved by drive units 72,76 through a clamping movement in which edge 83 engages the bent end 84 at surface 86 and a surface 88 on bent end 82 engages an inboard surface 90 of end 84; all of the aforesaid surface interfaces cooperating to form the plastisol casting clamping position of FIG. 5. In this position, the divider end 84 separates plastisol particles A cast on surface 56 from plastisol particles B cast on surface 58.

Once the plastisol is cast, the mold 34 and box 36 return to the FIG. 3 position. As shown in FIG. 6, the mold is positioned in an unclamped position which separates the split portions 35 and 37 to form the opening 79 for removing the divider 46 from the mold.

Figure 7:
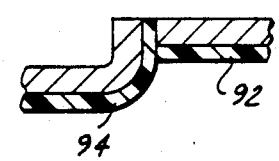
FIG. 7 is a fragmentary, enlarged sectional view of the split mold parts clamped to form an integral joint between previously cast shells formed on the split mold parts by partially fused plastisol particles.

Partially fused particles of plastisol define layers 92,94 on the casting surfaces 56,58 on the separated split portions 35,37. The split portions 35,37 are then moved through a clamping movement which causes the layer 92 to be joined and clamped to layer 94, as shown in FIG. 7. The layers 92,94 are folded and/or pushed together and are finally fused to form a folded joint in a unitary, one-piece product.

Figure 8:
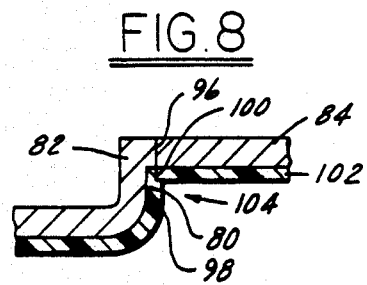
FIG. 8 is a fragmentary, enlarged sectional view of an abutting joint design of the split mold tooling.
Figure 9:
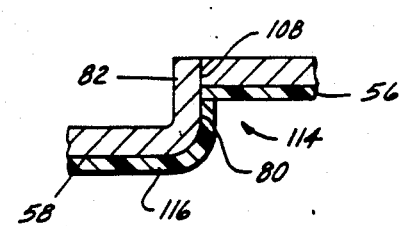
FIG. 9 is a second embodiment of the joint design of the split mold tooling shown in FIG. 9.

Two typical joint-line sections are shown in FIGS. 8 and 9. FIG. 8 shows an abutting joint. In this configuration the net tooling closure line 96 is disposed approximately midway of a plastisol layer 98 formed on the surface 80 of bent end 82. The end 100 of a layer 102 formed at the straight end 84 is thus abutted into and clamped to the layer 98 to form an L-shaped joint 104 therebetween.

In FIG. 9 a compression mortise joint is shown. It is formed by locating the net tooling closure line 108 at the surface 80 on bent end 82. Also, there is a vertical offset of the casting surfaces 56,58 so that a plastisol layer 112 cast on surface 56 will form a straight line joint 114 with respect to the plastisol 116 formed on surface 80 of bent end 82.

A typical powder casting process for a two-color door panel includes the following sequence.
1. Preheat tool in oven to temperature between 250° F. and 390° F.
2. After mold cast temperature is reached, attach the powder box to the mold.
3. Rotate box and mold.
4. Dwell time on top (for part thickness).
5. Rotate 180° and unclamp.
6. Clamp the split mold parts to join partially fused separate shells and return the mold to the oven for cure.

Examples of suitable mold heating processes for use with the process and apparatus of the present invention include mold temperature control by heated and cooled air or oil heating and cooling flow as set forth in U.S. Pat. No. 4,217,325 issued Aug. 12, 1980 to D. Colby. Suitable thermoplastic plastisol particles include plasticized polyvinyl chlorides and related vinyl resins in dry form for ease of gravity flow from the charge box 36 during both fill and return steps. Typical examples of parts, plastic materials and mold processes include the following:

Examples of parts that have been made by the dry PVC cast molding process include a door panel shell having a mold volume of approximately six (6) cubic feet.

PVC resin, plasticizer, stabilizer, release agents and color pigments are combined in a high intensity mixer to produce a dry, flowable powder of each desired color. The process is known in the industry as dry-blending.

The various compound components may be selected as to type and ratio to provide the properties required both for the finished product and for ease of processing. Physical properties will not be too dissimilar from those obtained with liquid plastisol which is also used to manufacture similar products but has an inherent weakness for forming objectionable drips and runs when made in complex shapes.

Processing properties are such that when melting of the plastic powder occurs, densification results in exact reproduction of minute detail such as grain marks and stitches engraved in the mold surface.

Mold preheating temperature may range from 250° F. to 390° F. Since the thickness of the finished product is also governed by the time the plastisol particles contact the mold, it should be understood that simultaneous charging of the particles to the split mold portions can be of definite advantage. Also, if certain areas of the mold can be made to have a lower pre-heated temperature than others, it will permit molding a thinner shell in those areas, since both temperature and mold-filled time determine the final thickness of the shell. Therefore, a very flexible range, for mold-filled time, of one second to ten seconds or more has been established.

Depending on formulation, final melting or fusion of the PVC powder occurs when mold temperatures reach 350° F. to 450° F.

After final fusion, the mold is cooled to a temperature which will facilitate removal of the shell without damage.

Specifically the process and apparatus of the present invention enable even and complete distribution of thermoplastic plastisol material onto mold surfaces to form large, long, thin-walled single-piece two-color or more shells for interior door panels and the like formed during short cycle mold cycles in limited plant floor space.

While representative embodiments of apparatus and process of the present invention have been shown and discussed, those skilled in the art will recognize that various changes and modifications may be made within the scope and equivalency range of the present invention.

What is claimed is:

1. In a process for molding a single-piece multi-color plastic shell the steps comprising:
    (1) heating an open-ended mold to a temperature near the melt temperature of a plastisol thermoplastic material;
    (2) connecting a charge box to the mold to fold a closed system with at least two color plastisol sources;
    (3) providing first and second split mold portions movable between clamping and unclamping positions with respect to a mold divider contained in the interior of the charge box; clamping said mold portions to the mold divider and charge box thereby defining the closed system including two chambers and first and second casting surfaces formed by the first and second mold portions and separated by the mold divider;
    (4) thereafter rotating the charge box and mold in a plastisol casting sequency for releasing plastisol particles of a separate color onto each of the casting surfaces by gravity to build up separate partially fused plastisol shells of desired shape and size on each of the split mold portions;
    (5) separating the split mold portions for removal of the divider and charge box from the mold;
    (6) and thereafter positioning the split mold portions together to clamp the separate partially fused shells together and finally fusing the shells to form an integral joint therebetween.

2. In the process of claim 1, providing a first bent edge on said first split mold portion, thereby forming said first casting surface with said first bent edge, and a straight edge on said second split mold portion, thereby forming said second casting surface with said straight edge, providing a divider with a second bent edge; positioning the first and second split mold portions apart to form a space between the first bent edge and the straight edge of a width to accommodate the second bent edge therebetween; and positioning the split mold portions during casting so as to clamp the second bent edge between the first bent edge and the straight edge so as to form a pocket for casting a first charge of plastisol particles against said first casting surface first bent edge and against said second casting surface.

3. In the process of claim 2, locating said straight edge of said second casting surface at the midpoint of said first bent edge of said first casting surface to clamp said partially fused plastisol shell cast on said second casting surface to said partially fused plastisol shell cast on said first casting surface to form an integral L-shaped abutting joint between said partially fused plastisol shells.

* * * * *